H. J. ROTH.
COLLAR PROTECTOR.
APPLICATION FILED FEB. 4, 1913.
1,084,037.
Patented Jan. 13, 1914.
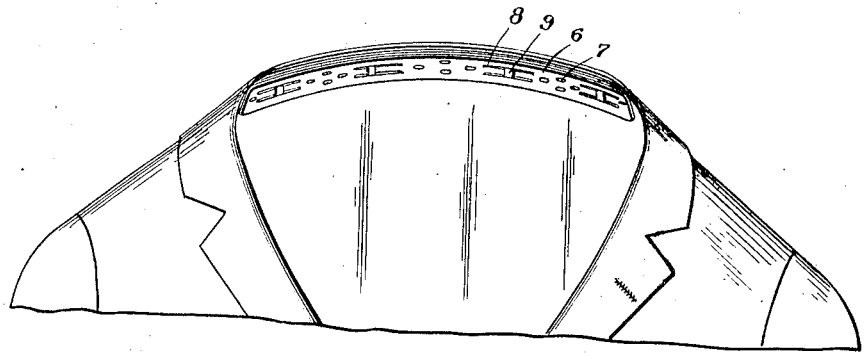
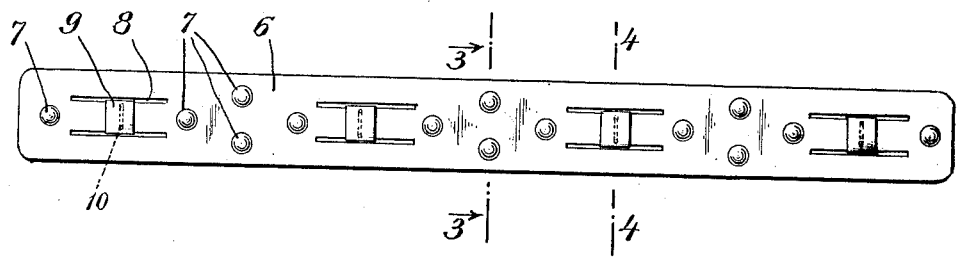
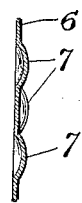
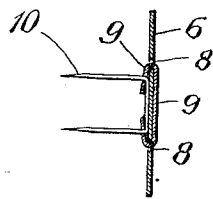
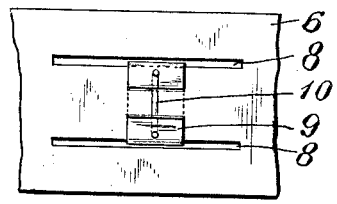
WITNESSES
INVENTOR
Henry J. Roth
BY
Edmonds & Edmonds
ATTORNEYS
COLUMBIA PLANOGRAPH CO., WASHINGTON, D. C.

UNITED STATES PATENT OFFICE.

HENRY J. ROTH, OF NEW YORK, N. Y.

COLLAR-PROTECTOR.

1,084,037.

Specification of Letters Patent. Patented Jan. 13, 1914.

Application filed February 4, 1913. Serial No. 746,116.

*To all whom it may concern:*

Be it known that I, HENRY J. ROTH, a citizen of the United States, residing in the borough of Brooklyn, county of Kings, city and State of New York, have invented certain new and useful Improvements in Collar-Protectors, of which the following is a specification.

This invention is directed to the provision of a device adapted to be affixed to the collar of a coat so as to protect a linen collar from being soiled by the coat collar contacting therewith and rubbing thereon.

The invention contemplates the provision of a strip, preferably made of celluloid provided with securing devices whereby it can be secured to the inner side of the collar of a coat. These securing devices are specially formed so as to permit the protector to move slightly relatively to the coat as may be required by the movements of the wearer in order to prevent binding or buckling. Also this celluloid strip is pressed out at a plurality of distributed points so as to form raised portions of relatively small area, these raised portions being adapted to bear against the linen collar and act as spacers for holding the collar of the coat a slight distance away from the linen collar. The device is so constructed that it may be readily applied to a coat or detached therefrom and in addition to its function in protecting the linen collar from being soiled, it serves the further purpose of holding the collar of the coat in its proper shape.

The preferred embodiment of the invention is illustrated in the accompanying drawings, in which—

Figure 1 is a view of the upper portion of a coat having the protector applied thereto; Fig. 2 is a front view of the protector; Figs. 3 and 4 are transverse sections on lines 3—3 and 4—4 of Fig. 2 and Fig. 5 is a detail view of a portion of the side of the protector opposite that shown in Fig. 2.

Referring to these drawings, the protector consists of a strip 6 of celluloid preferably about ten inches long. This strip is pressed so as to provide a plurality of raised portions 7 projecting outwardly from the side of the device toward the linen collar when the device is in use. The strip 6 also has a plurality of pairs of parallel slots 8 cut therein. Each pair of parallel slots 8 is adapted to receive a short strip 9 of celluloid which extends between the slots of a pair on the front side of the protector and has its ends extending through the slots 8. A staple 10 of thin wire is secured to each strip 9 by passing its ends through the ends of the strip. In this way the strips 9 are secured to the protector 6 as are also the staples 10, the latter being held in the appropriate positions with their ends projecting from the protector.

The device constructed as above set forth is applied to the inner side of the collar of a coat a short distance below the upper edge of the collar. In Fig. 1 the protector is shown so applied to a coat. In securing the protector in position, the ends of the staples 10 are passed through the material of the coat and are turned over upon the coat. The turn-down collar of the coat conceals the ends of the staples 10. When so positioned upon the coat, the protector will be interposed between the collar of the coat and the linen collar of the wearer, and furthermore the raised portions 7 projecting outwardly from the protector will bear at their ends upon the linen collar so that it is only these raised portions that touch upon the linen collar. As a result of this the linen collar is protected so that it is not soiled by the coat collar contacting with it and rubbing upon it.

It will be noted that the pairs of slots 8 are of substantially greater length than the width of the strips 9 so that these strips can move relatively to the strip 6 over a considerable range. By reason of this provision, the strip 6 forming the protector can move relatively to the coat even when held to the coat by means of the staples 10. As a result of this, the protector will give when necessary, as, for instance, when the coat is pulled in any way, and unusual movements of the coat occasioned by such pulling will not result in tearing the protector.

The raised portions 7 in addition to holding the body of strip 6 slightly away from the linen collar serve the purpose of stiffening the strip 6 and thereby giving it additional strength. Furthermore the protector thus constructed is invisible since it lies slightly below the upper edge of the coat and the securing devices are concealed by the turn-over collar. While the protector may be made from various materials, I prefer to employ celluloid as this may be cleaned quite readily even without detaching from the coat. This form of protector also serves the purpose of holding the coat in its proper shape so as to prevent sagging thereof.

Having described my invention, what I claim as new therein and desire to secure by Letters Patent of the United States is:

1. A collar protector consisting of a flexible strip adapted to be secured to the inner side of a coat collar and a plurality of securing devices spaced apart in the direction of the length of the strip for attaching the strip to the coat collar, said devices being connected to the strip but movable relatively to the strip to a material extent in the direction of the length of the strip, substantially as set forth.

2. A protector for the collar of a coat consisting of a flexible strip having pairs of parallel slots therein and securing devices for attaching the strip to the inner side of the collar of a coat attached to the strip by passing through said parallel slots, substantially as set forth.

3. A protector for the collar of a coat consisting of a flexible strip having pairs of parallel slots cut therein, strips attached to said strip by passing them through the parallel slots of a pair and securing devices, each secured to one of said last-named strips, substantially as set forth.

4. A protector for the collar of a coat consisting of a strip of flexible material having a plurality of raised portions at distributed points thereon and a plurality of securing devices on said strip, each movable relatively to the strip in the direction of the length of the strip and each adapted to be engaged with the coat to secure the protector in position, substantially as set forth.

HENRY J. ROTH.

Witnesses:
James V. Goetz,
Frederick G. Huber.